(12) United States Patent
Dahlhoff et al.

(10) Patent No.: US 7,379,499 B2
(45) Date of Patent: May 27, 2008

(54) METHOD FOR CONDUCTING A DIRECTED PREDICTION OF AN IMAGE BLOCK

(75) Inventors: Achim Dahlhoff, Aachen (DE); Mathias Wien, Aachen (DE)

(73) Assignee: Robert Bosch GmbH, Stuttgart (DE)

( * ) Notice: Subject to any disclaimer, the term of this patent is extended or adjusted under 35 U.S.C. 154(b) by 823 days.

(21) Appl. No.: 10/479,678

(22) PCT Filed: Sep. 12, 2002

(86) PCT No.: PCT/DE02/03390

§ 371 (c)(1),
(2), (4) Date: Dec. 4, 2003

(87) PCT Pub. No.: WO03/049452

PCT Pub. Date: Jun. 12, 2003

(65) Prior Publication Data

US 2004/0136458 A1    Jul. 15, 2004

(30) Foreign Application Priority Data

Nov. 30, 2001  (DE) ................. 101 58 658

(51) Int. Cl.
*H04N 7/12* (2006.01)
*G06K 9/36* (2006.01)

(52) U.S. Cl. .................. 375/240.16; 382/236

(58) Field of Classification Search .......... 375/240.16, 375/240.15, 240.07, 240.27, 240.12; 382/232, 382/236, 238

See application file for complete search history.

(56) References Cited

U.S. PATENT DOCUMENTS

| 4,951,139 | A | * | 8/1990 | Hamilton et al. | ...... 375/240.07 |
| 5,737,022 | A | * | 4/1998 | Yamaguchi et al. | ... 375/240.15 |
| 5,978,509 | A | * | 11/1999 | Nachtergaele et al. | ...... 382/236 |
| 2002/0110197 | A1 | * | 8/2002 | Pearlstein et al. | ..... 375/240.27 |
| 2004/0105586 | A1 | * | 6/2004 | Bayazit | ..................... 382/232 |
| 2004/0136458 | A1 | * | 7/2004 | Dahlhoff et al. | ....... 375/240.12 |

FOREIGN PATENT DOCUMENTS

| EP | 1 146 748 A | 10/2001 |
| WO | 91 14340 A | 9/1991 |
| WO | 98 41025 A | 9/1998 |

OTHER PUBLICATIONS

G Bjontegaard et al: "H.26L Test Model Lonfterm (TML) 8", DOC. VCEG-N10, ITU-T Q6/SG16 VCEG, 14-TH Meeting, Sanata Barbara, CA, Sep. 2001, pp. 1-46.

(Continued)

*Primary Examiner*—Gims Philippe
(74) *Attorney, Agent, or Firm*—Michael J. Striker

(57) ABSTRACT

Pixels on the edge (A, B, C, D; E, F, G, H; I) of previously predicted neighboring picture blocks (A', B') are used for directional prediction of a picture block (C'). Depending on the prediction direction, the pixels used for prediction are prefiltered along an edge of the actual picture block to be predicted (C') in order to suppress prediction artifacts.

6 Claims, 2 Drawing Sheets

OTHER PUBLICATIONS

G. Bjontegaard: "H.26L Test Model Long Term No. 8 . . . " IITU-T Telecommunication Standardization Sector of ITU, Apr. 2, 2001, pp. 16-19.

Patent Abstracts of Japan vol. 013, No. 468, Oct. 23, 1989 & JP 01 183276 A , Jul. 21, 1989.

Hiroshi Fujiwara: "Neues MPEG-Lehrbuch MIT Abbildungen" (New MPEG Textbook With Illustrations), ASCII Corporation, Japan, Aug. 1, 1994, pp. 72-77 (With Partial Eng. Translation). ITU-Telecommunications Standardization Sector, XP-002250455, Jun. 28, 2001.

* cited by examiner

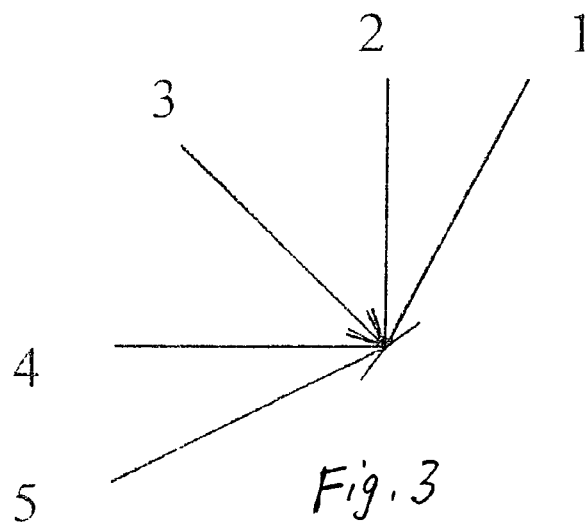
Fig. 2
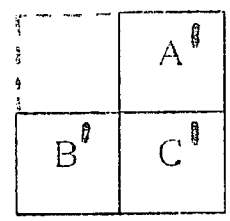
Fig. 1
Fig. 3
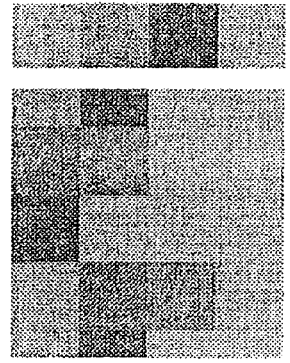
Fig. 4

METHOD FOR CONDUCTING A DIRECTED PREDICTION OF AN IMAGE BLOCK

CROSS-REFERENCE

The invention described and claimed hereinbelow is also described in PCT/DE 02/03390, filed on Sep. 12, 2002 and DE 101 58 658.2, filed Nov. 30, 2001. This German Patent Application, whose subject matter is incorporated here by reference, provides the basis for a claim of priority of invention under 35 U.S.C. 119 (a)-(d).

BACKGROUND OF THE INVENTION

The present invention is directed to a method for directional prediction of a picture block composed of pixels, in particular for the intra prediction of picture blocks greater than 4×4 pixels in size.

It is made known in reference [1], http://standard.pictel.com/ftp/video-site/0109 San/, in particular on pages 9 through 11, that video coding standard H.26L entails carrying out intra prediction on 4×4 pixel blocks or 16×16 pixel blocks. "Intra prediction" means that only that information about an actual picture that was previously transmitted is used to generate a prediction signal (e.g., the first picture in a video sequence is always "intra" coded). According to [1], six modes are available for 4×4 prediction. These modes differ in terms of the direction from which prediction takes place. In this process, the pixels on the edge of previously predicted (coded) neighboring picture blocks are used for prediction.

SUMMARY OF THE INVENTION

With the features of the present invention, pixels on the edge of at least one previously predicted neighboring picture block are also used to predict an actual picture block. In addition, those pixels that are used for prediction depending on the prediction direction are pre-filtered along an edge of the current picture block to be predicted, however. This pre-filtering results in improved prediction characteristics, in particular for blocks having a large edge length, i.e., an edge length that is greater than four pixels long.

The present invention is based on the knowledge that, if directional prediction is to be used for block sizes greater than 4×4 pixels, e.g., 4×8, 8×4, 8×8, 16×8, . . . , 16×16 pixels, then very concise structures are produced in the predicted picture block, the structures resulting in strong artifacts in the reconstructed picture. With the pre-filtering according to the invention, these artifacts are prevented by smoothing the prediction signal; this results in a subjective and objective improvement of the coding procedure for the transfer of picture blocks predicted in this manner.

The pixels of a neighboring picture block that are used for prediction are combined into one prediction vector, and low-pass filtering is carried out along the direction of the prediction direction. This measure simplifies the processing expense compared to a possible one-pass filtering.

Due to the heaviest weighting of the low-pass filtering at the zero position, i.e., at the position of a pixel to be predicted at that instant, the course of the prediction vector is retained, but the filtering results in a smoothing of the vector. The influence of the adjacent prediction values on the actual position becomes less the further removed they are from the actual position. This procedure dampens the formation of artifacts particularly effectively as block sizes increase.

Further features of the present invention also make an advantageous contribution to the suppression of artifacts.

The present invention also offers advantageous measures for handling block edges. In particular, the continuation of the prediction vector with its edge values simplifies the processing and storage expense. This results in increased coding efficiency.

BRIEF DESCRIPTION OF THE DRAWING

Exemplary embodiments of the invention are explained with reference to the drawing.

FIG. 1 shows a picture block to be predicted, with its neighboring picture blocks, FIG. 2 shows an actual picture block to be predicted, with its individual pixels and the pixels of the neighboring picture blocks on its edges, FIG. 3 shows the prediction directions of the various prediction modes, FIG. 4 shows a picture block that is 4×4 pixels in size with predicted pixels, using previously predicted pixels from a neighboring block.

DETAILED DESCRIPTION OF THE EMBODIMENTS

Figure 6:
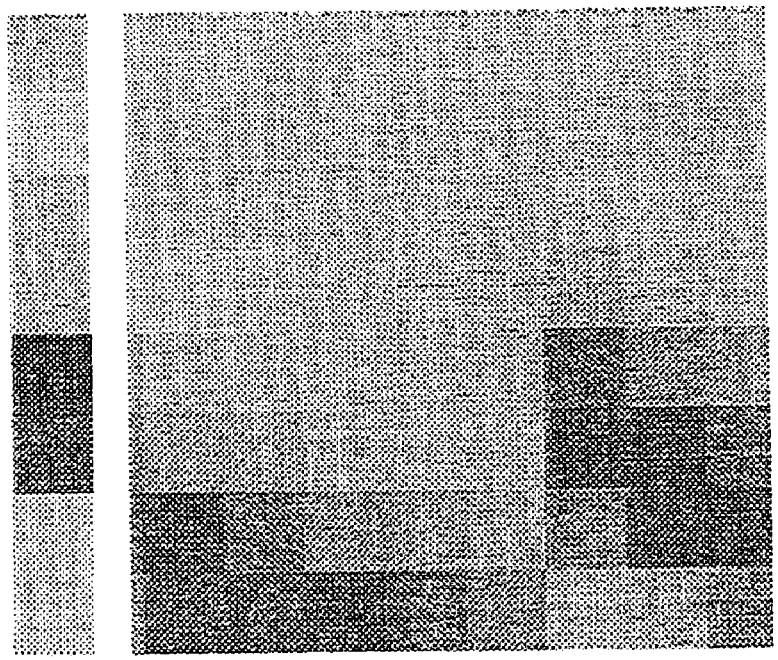
FIG. 6 shows the picture block in FIG. 5, but with pre-filtering according to the invention.

Before the invention itself is discussed, the direction-dependent intra prediction made known in [1] will be described in greater detail, to facilitate a better understanding. Intra prediction according to [1] is carried out on 4×4 pixel blocks or 16×16 pixel blocks. Six modes are available for 4×4 prediction; they differ in terms of the direction from which prediction is carried out. The pixels on the edge of previously coded neighboring picture blocks are used for prediction. Possible blocks A' and B' adjacent to the actual picture block C' to be predicted are shown in FIG. 1. FIG. 2 shows the actual picture block C' with its pixels a, b, c, . . . , p and the pixels on the edges of the neighboring picture blocks, namely A, B, C, D of picture block A' on top, and E, F, G, H of the neighboring picture block B' on the left, and I of the neighboring block that abuts it in the upper left-hand corner (shown in FIG. 1 as a dashed line).

In addition to DC (direct component) prediction, in which the mean of positions A through H are used as prediction for all pixels in picture block C', five modes having various prediction directions are available. In addition to horizontal and vertical prediction, three diagonal prediction directions are possible as well. The prediction directions are depicted in FIG. 3. An example of prediction using mode 1 is shown in FIG. 4. In this mode, only pixels A through D are used for prediction. In mode 1, prediction takes place as follows:

| Prediction of pixel | By |
|---|---|
| a | (A + B)/2 |
| e | B |
| b, i | (B + C)/2 |
| f, m | C |
| c, j | (C + D)/2 |
| d, g, h, k, l, n, o, p | D |

Prediction based on 16×16 pixel blocks is used in picture regions with little activity. DC prediction, horizontal and vertical prediction, and a somewhat more complex "plane" prediction method are available for this purpose. For a complete description of intra prediction methods, reference is made to H.26L Test Model (TML) [1].

The methods presented for 4×4 prediction can be expanded directly to other block sizes. To do this, the predictions are continued accordingly.

If directional prediction of the type defined previously for 4×4 picture blocks are to be used for picture blocks having more than 4×4 pixels, e.g., 4×8, 8×4, 8×8, 16×8, ..., 16×16, very concise structures can be produced in the predicted picture block, the structures resulting in strong artifacts in the reconstructed picture. The measures according to the invention prevent these artifacts and therefore result in a subjective and objective improvement of the coding procedure.

The description is based on the directional prediction modes used in TML [1] for the intra coding of 4×4 picture blocks. Picture blocks that are 4×8, 8×4, 8×8, 8×16, 16×8 and 16×16 pixels in size are considered. Filtering is used at the edges having lengths >4 pixels long, i.e., for edges that are 8 or 16 pixels long. The method can also be used for other block sizes and prediction directions.

The pixels of the actual picture block that is M lines and N columns in size are referred to hereinbelow as:

$P(i, j), i=0, \ldots, N-1, j=0, \ldots, M-1$

The pixels of the neighboring picture blocks used for prediction are located in positions $P(-1, j)$ and $P(i, -1)$. They are combined hereinbelow in prediction vector $V(n)$ having length $N_f$. In the case of mode 1 prediction presented hereinabove for 4×4 blocks, the following therefore applies, with $N_f=4$:

$V(n)=P(n,-1)=[A, B, C, D], n=0, \ldots 3.$

To predict a picture block, $V(n)$ is not used, rather, a filtered version $V_f(n)$ is used. For filtering, a (low-pass) filter having a suitable length L is used, e.g.:

| Edge length | Filter h(n) | Filter length L |
| --- | --- | --- |
| 8 | 7/32, 18/32, 7/32 | 3 |
| 16 | 3/32, 7/32, 12/32, 7/32, 3/32 | 5 |

Pre-filtering takes place depending on the prediction direction. In mode 1 presented hereinabove, it takes place along the upper block edge picture block C' to be predicted. Pre-filtering takes place along the direction of prediction vector $V(n)$.

Using low-pass filtering, a smoothing of the prediction signal is achieved. There are many possibilities for handling the edge.

Constant continuation with $V(0)$ and $V(N_f-1)$ at the edges

For the right and bottom edge, use previously coded pixels that are located beyond the block edge region, e.g., $V(n)=P(n, -1)$ with $n=N, \ldots N_f-1$ For the left and top edge: continuation of the prediction vector along the edge, e.g,:

$V(n)=P(n, -1)$, for $n=0, N_f-1$ $V(n)=P(-1, -(n+2))$, for $n=-int(L/2), \ldots, -1$ In this case, int(x) means "rounding by truncation".

Figure 5:
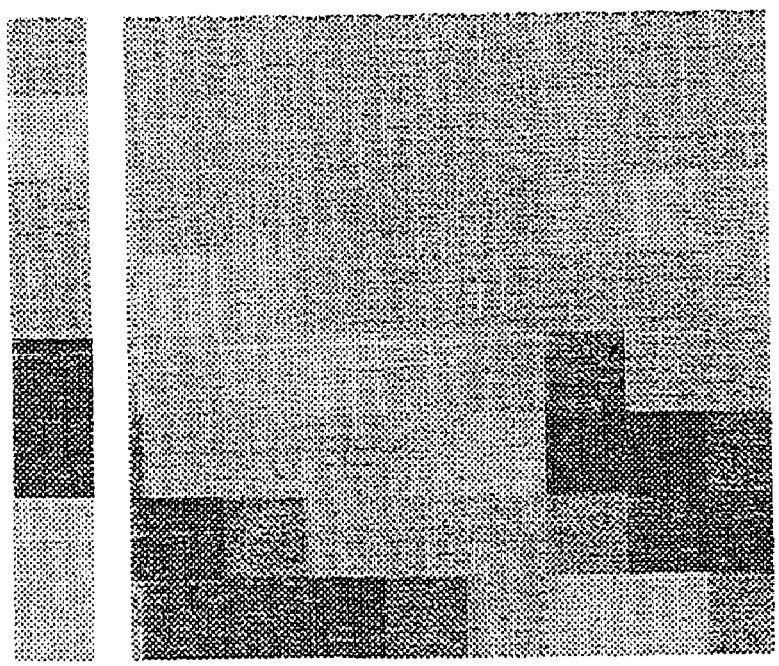
FIG. 5 shows a picture block that is 8×8 pixels in size with unfiltered prediction.

The effect of pre-filtering is shown in FIG. 5 using an 8×8 picture block as an example, with prediction mode 1. FIG. 5 depicts unfiltered prediction.

FIG. 6 depicts the predicted picture block with pre-filtering using the filter with length 3 indicated hereinabove for the edge length of 8 pixels.

A possible embodiment of pre-filtering is presented hereinbelow.

The following is given: an 8×8 block $P(i, j)$, $i, j=0, \ldots, 7$, with a prediction vector $V(n)$, $n=0, \ldots, 7$.

Filtering is carried out using a 3-tap filter for picture blocks having an edge length 8, with filter coefficients $h(n)=(7\ 18\ 7)/32$.

Pre-filtering with constant continuation at the edges results in:

$V_f(0)=(7*V(0)+18*V(0)+7*V(1))/32$ $V_f(1)=(7*V(0)+18*V(2)+7*V(3))/32$ $V_f(2)=(7*V(1)+18*V(3)+7*V(4))/32$ $V_f(7)=(7*V(6)+18*V(7)+7*V(7))/32$

Vector $V_f(n)$, $n=0, \ldots, 7$ is then used for prediction of the actual picture block C'.

As depicted in FIG. 5, strong artifacts of prediction are visible when coarse quantization is carried out without using the method according to the invention. Instead, when the method according to the invention is used, a soft course appears (using low-pass filtering). In picture blocks in which all AC (alternating component) coefficients were quantized to zero, the picture block can be determined directly from the pixels on the edge of the neighboring picture blocks when the prediction mode and the filter used are known.

Reference:

[1] G. Bjontegaard and Thomas Wiegand (eds.), 'H.26L Test Model Long-Term (TML) 8', Doc. VCEG-N10, ITU-T Q6/SG16 VCEG, 14th Meeting, Santa Barbara, Calif., September 2001

What is claimed is:

1. A method for directional prediction of a picture block (C') composed of pixels (a, b, . . . , p), in particular for the intra prediction of picture blocks greater than 4×4 pixels in size, comprising the steps of using pixels on the edge (A, B, C, D; E, F, G, H) of at least one previously predicted neighboring picture block (A', B') for prediction of an actual picture block (C'), prefiltering those pixels that are used for prediction depending on the prediction direction along an edge of the current picture block (C') to be predicted, combining the pixels of the at least one neighboring picture block that are used to predict the actual picture block into one prediction vector, and carrying out low-pass filtering of the pixels used for prediction along the direction of the prediction vector.

2. The method as recited in claim 1, further comprising weighting the zero position most heavily in the low-pass filtering.

3. The method as recited in claim 1, further comprising also using pixels for low-pass filtering that are located beyond the edge region of the actual picture block.

4. The method as recited in claim 3, further comprising obtaining the pixels for prediction that are located beyond the block edge region by continuing the prediction vector at the block edges.

5. The method as recited in claim 4, further comprising using the vector component values at the beginning and end of the prediction vector to continue the prediction vector.

6. The method as recited in claim 4, further comprising, to continue the prediction vector, using previously predicted pixels of neighboring picture blocks that do not directly share a block edge with the current picture block to be predicted.

\* \* \* \* \*